J. d'HEUREUSE.
APPARATUS FOR DISTRIBUTING LIQUID MANURE.
No. 190,293. Patented May 1, 1877.
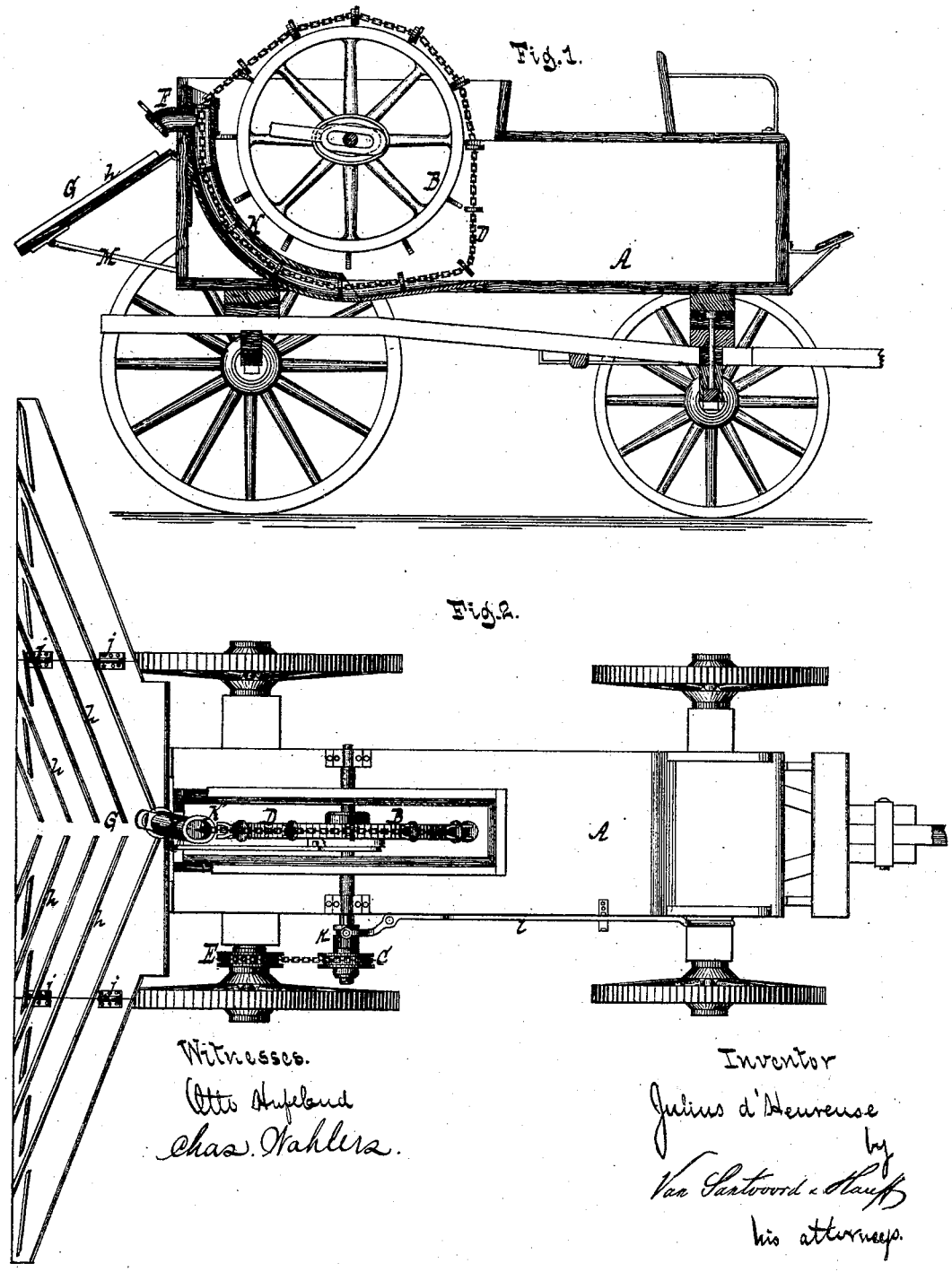

UNITED STATES PATENT OFFICE

JULIUS D'HEUREUSE, OF SCHMETZDORF, PRUSSIA, ASSIGNOR TO R. D'HEUREUSE, OF NEW YORK, N. Y.

IMPROVEMENT IN APPARATUS FOR DISTRIBUTING LIQUID MANURE.

Specification forming part of Letters Patent No. 190,293, dated May 1, 1877; application filed April 4, 1877.

*To all whom it may concern:*

Be it known that I, JULIUS D'HEUREUSE, of Schmetzdorf, Prussia, have invented a new and Improved Apparatus for Distributing Liquid Manure, which invention is fully set forth in the following specification, reference being had to the accompanying drawing, in which—

Figure 1 represents a longitudinal vertical section. Fig. 2 is a plan or top view.

Similar letters indicate corresponding parts.

This invention relates to liquid-manure-distributing machines; and consists of an endless-chain pump, the chain of which runs over a wheel situated in the wagon-box and mounted on a shaft, which receives its motion from one of the wheels or axles. The discharge-spout of the pump may be made movable, so that the discharge can be adjusted toward one side or toward the other, as may be desirable. With the pump and its discharge-spout is combined a distributing apron or chute, made preferably in sections, which are connected by hinge-joints, so that the manure can be made to cover an area of greater or less width.

In the example shown by the drawing, the letter A designates the box of a wagon, in which is situated a chain-wheel, B, and on this wheel runs the endless chain D. On the shaft of the chain-wheel B is mounted a pulley or wheel, C, which connects, by a chain or equivalent means, with a pulley, E, secured to one of the wheels of the wagon, if said wheel is mounted loosely on its axle; but if the wagon-wheel is mounted firmly on its axle, so that said axle revolves with the wheel, the pulley E may be mounted on the axle in any convenient position.

To the rear end of the box A is hinged an apron or chute, G, which is retained at the desired inclination by means of braces M; and these braces are so constructed that by their action the inclination of the chute can be increased or diminished, to suit circumstances. The chute is provided on its surface with a series of slats, $h\ h$, which serve to spread the liquid manure, and said chute is constructed in three or more sections, which are connected together by hinge-joints $j$, so that the width of the chute can be increased or diminished at pleasure.

From the bottom of the box A rises a tube, K, which is by preference curved, as shown in Fig. 1; and through this tube passes the chain D, said chain being provided with a series of buckets, which fit the tube, so that when the wagon is drawn along the liquid manure is carried up through the tube K to the spout F. This spout may be firmly attached to said tube, but I prefer to connect it thereto in such a manner that it can be swiveled round, and that, by adjusting said spout, the manure can be thrown toward one side or toward the other, as may be desirable. The operation of adjusting the spout may be performed by hand, or said spout may be connected to one of the wagon-wheels, so that its adjustment can be effected by mechanical means from said wheel.

The pulley C, which transmits motion to the shaft of the chain-wheel B is mounted loosely thereon, and it is thrown in or out of gear by means of a clutch, $k$, and clutch-lever $i$, so that the pump can be started or stopped when the wagon is in motion.

By the action of the pump the manure contained in the box A is discharged on the chute G, and it is distributed over the field to the full width of said chute, if its sections are unfolded, or to a less width if one or both end sections of the chute are turned up.

By the action of the buckets on the chain D such solid parts as may be mixed with the manure are broken up and discharged through the spout F, together with the liquid, the solid and the liquid portions being at the same time thoroughly mixed.

If the pump is not in operation, and the wagon is driven home or from one field to another, the end sections of the chute are folded over the middle section, so that they do not interfere with the motion of the wagon.

If desired, the shaft which operates the pumping mechanism may also be moved by hand.

What I claim as new, and desire to secure by Letters Patent, is—

1. In an apparatus for distributing liquid manure, the combination of an endless bucket-chain, D, tube K, chute G, and box A, substantially as and for the purpose herein set forth.

2. In an apparatus for distributing liquid manure, the combination of a swivel-spout, F, with the endless bucket-chain D, tube K, and box A, substantially as and for the purpose described.

3. In an apparatus for distributing liquid manure, the combination of a chute, G, having slats h, and made in sections, with a wagon-box, A, and with a pumping mechanism, all constructed and operating substantially as and for the purpose herein set forth.

J. D'HEUREUSE.

Witnesses:
   H. FRUCHOW,
   M. KÜHN.